United States Patent [19]

Logan

[11] Patent Number: 4,888,166

[45] Date of Patent: Dec. 19, 1989

[54] PROCESS FOR MAKING HIGHLY REACTIVE SUB-MICRON AMORPHOUS TITANIUM DIBORIDE POWDER

[75] Inventor: Kathryn V. Logan, Roswell

[73] Assignee: Georgia Tech Research Corporation, Atlanta, Ga.

[21] Appl. No.: 903,265

[22] Filed: Sep. 3, 1986

[51] Int. Cl.$^4$ ............................................. C01B 35/04
[52] U.S. Cl. ..................................................... 423/297
[58] Field of Search ........................... 423/297; 75/27

[56] References Cited

U.S. PATENT DOCUMENTS

| | | | |
|---|---|---|---|
| 2,088,838 | 8/1937 | Cole et al. | 501/96 |
| 3,016,288 | 1/1962 | Andrieux et al. | 423/278 |
| 3,328,129 | 6/1967 | Muta et al. | 423/291 |
| 3,338,679 | 8/1967 | Muta et al. | 423/291 |
| 3,351,429 | 11/1967 | Timms | 423/297 |
| 4,503,021 | 3/1985 | Byrnestad et al. | 423/297 |

FOREIGN PATENT DOCUMENTS

| | | | |
|---|---|---|---|
| 60-235717 | 11/1985 | Japan | 423/297 |
| 1497025 | 1/1978 | United Kingdom . | |

OTHER PUBLICATIONS

CRC Handbook of Chemistry and Physics, 62nd ed. Weast et al, eds. CRC Press, Inc. 1981, p. B-24.
Paul Schwarzkopf et al, *Refractory Hard Metals*, Macmillan Company, N.Y., 1953, p. 273.

Primary Examiner—John Doll
Assistant Examiner—Jeffrey Edwin Russel
Attorney, Agent, or Firm—Hurt, Richardson, Garner, Todd & Cadenhead

[57] ABSTRACT

A method of producing submicron titanium diboride from an initial mixture of titanium oxide, boron oxide, and magnesium, by reducing the titanium dioxide and boron oxide with magnesium in an atmosphere including air to yield a resultant product containing submicron titanium diboride and magnesia. The reduction reaction is preferably initiated by locally igniting the initial mixture. The resultant product is then cooled and leached with a leaching solution having a pH in the range of about 0.5 to about 8 to recover the sub-micron titanium diboride.

13 Claims, 1 Drawing Sheet

PROCESS FOR MAKING HIGHLY REACTIVE SUB-MICRON AMORPHOUS TITANIUM DIBORIDE POWDER

BACKGROUND AND SUMMARY OF THE INVENTION

This invention relates to the production of titaninum diboride and is directed to an improved process for so doing.

A variety of methods have been developed for producing metal borides such as titanium diboride, as follows:

1. Direct combination of the metal with boron or a metal hydride and boron.
2. Hydrogen reaction of a boron halide with a metal source such as an oxide.
3. Electrolysis of a melt consisting of a metal oxide, boron oxide, and an alkali flux.
4. Reduction of a metal oxide with boron (borothermic) or co-reduction with oxide by carbon (carbothermic).
5. Reduction of oxides by metals.
6. Arc-plasma reaction from vapor reactants.

Methods 1-3 are used mainly in laboratory experimentation. Method 4 has been employed commercially but the borothermic method requires large amounts of boron over what the final product contains and is thus too wasteful for high production levels. The carbothermic method, however, is the one generally used to produce titanium diboride. In this method, the raw materials are heated to a temperature in the range of 1800°-2000 °C. until titanium diboride is formed. The powdered titanium diboride ultimately recovered requires forming temperatures in about this same range. Method 5 has been attempted but found to produce contaminants of other borides as well as borides and titanates, and has not been considered a commercially viable method. Method 6 produces pyrophoric titanium diboride from expensive reagents.

The principle disadvantages of the above methods are, for 1, expensive raw materials and the likelihood of formation of potentially explosive boranes; for 2-4, expensive raw materials and reaction vessels; for 5, production of contaminant borides, borates and titanates; and for 6, expensive raw materials, reaction vessels and formation of pyrophoric titanium diboride. The carbothermic method, method 4, is currently being developed commercially to produce sub-micron, crystalline titanium diboride at reduced cost. Based upon a raw material cost of about $14.00 per pound, titanium diboride costing about $36.00–40.00 per pound is possible at the present time. High temperatures are required in the processing; and in order to obtain the product in sub-micron size, final grinding, a source of contamination, is also required. The resultant powdered, sub-micron titanium diboride is crystalline (hexagonal) and is difficult to sinter. The powder must be vacuum sintered at 2200° C. or hot pressed at 1800°-2200° C., and even at carefully controlled processing conditions, micro-stresses are caused by thermal expansion of individual crystallites by different amounts in the a and c directions.

In accord with this invention, a highly reactive, sub-micron titanium diboride powder of variable crystallinity (amorphous to crystalline) and purity, dependent on control of processing parameters, is produced in situ from an exothermic reaction mixture, thereby eliminating the need for grinding, and attaining, for the first time it is believed, sub-micron titanium diboride powder of highly reactive form. By "highly reactive" is meant sufficient reactivity to significantly decrease the temperature required for sintering. Products of this invention may be sintered by hot pressing at temperatures in the range of 1300°-1500° C. as opposed to the normally required range of 1800°-2200° C.

A process parameter which affects whether, or the degree to which the resultant product is amorphous, is the rapidity with which the composition is cooled after the exothermic reaction and the ability to suspend the powder during the reaction preventing localized sintering and grain growth.

The purity of the product, e.g., the absence of borates and titanates therein is strongly dependent upon control of the weight amounts of the components of the reaction mixture. The absence of borates and titanates formed during the leaching step is strongly dependent upon the pH control of the leaching solution. It has been found that if the magnesium and the boron oxide are present in amounts of about 5-30% in excess of stoichiometric in the reaction mixture, the titanium diboride will be a mixture of amorphous and crystalline forms. When the magnesium and boron oxide are present in excess of stoichiometric, the best results are attained.

The process of this invention appears inherently to provide the titanium diboride in sub-micron, highly reactive form.

The process of the invention is practiced successfully when the reducing metal of the exothermic reaction is magnesium.

These and other objects of the invention will become apparent as this description proceeds.

BRIEF DESCRIPTION OF THE DRAWING FIGURE

FIG. 1 is an X-ray diffraction chart of the product obtained by this invention.

DETAILED DESCRIPTION

EXAMPLE 1

Figure 1:
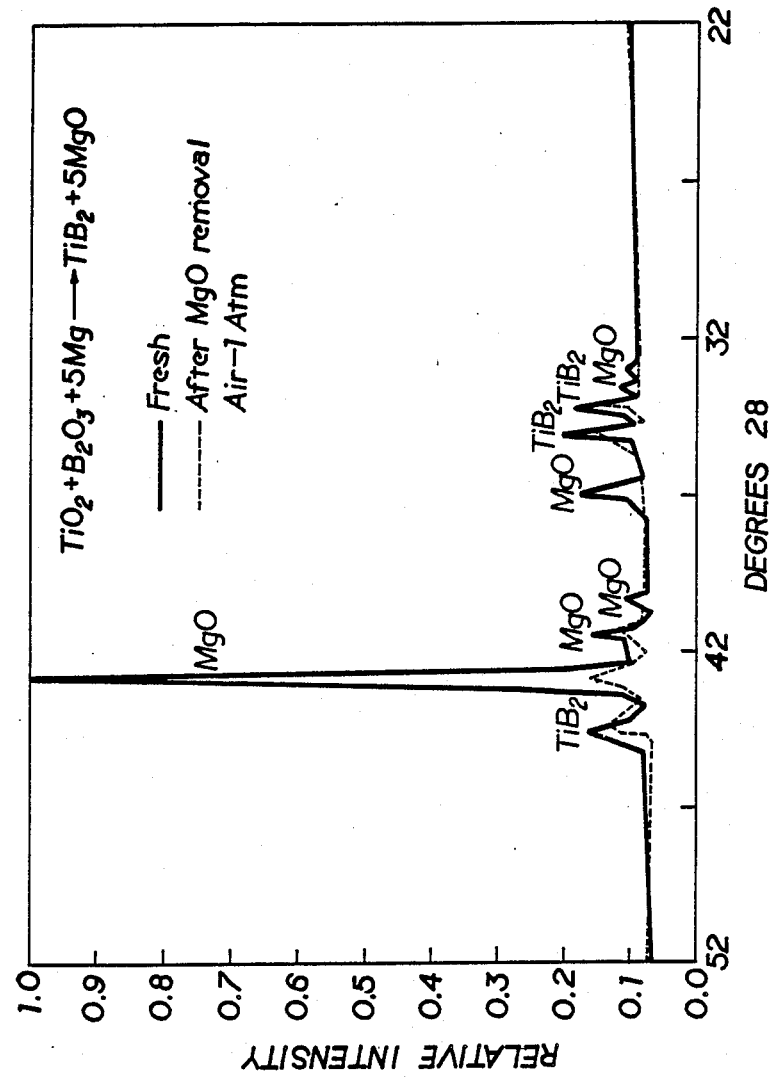

Stoichiometric amounts of $TiO_2$, $B_2O_3$ and Mg, each of particle size to pass 50 mesh (U.S. Standard Mesh) were mixed to provide the thermite type exothermic reaction mixture. The reaction mixture was ignited in air at atmospheric pressure by local heating with nichrome wire. Upon ignition, the reaction proceeded vigorously to completion. The reaction products were found to contain borate and titanate contaminants, although the titanium diboride was present in sub-micron, highly reactive form.

EXAMPLE 2

Stoichiometry as in Example 1 was varied over the range of about 5% to about 30% excess of Mg and $B_2O_3$ in a series of Examples and it was discovered that the amounts of the contaminants in the form of borates and titanates was reduced. An excess of about 10% of the above metal and oxide was found to produce the least amounts of these contaminants in 100 gm batches. The excesses were adjusted whenever the ignition batch size was changed.

EXAMPLE 3

Products obtained in accord with Examples 1 and 2 were leached with a dilute $HNO_3$ solution to remove the magnesium oxide resulting from the exothermic reaction. It was found that if the solution is allowed to be extremely acidic (less than about pH 0.5) titanates will form rapidly. Whereas, if the solution is allowed to be alkaline (pH of more than about 8.0), borates will form rapidly.

The relative success of the acid wash was visually apparent from the relative "grayness" of the recovered powder. Light gray indicated that the recovered powder contained contaminants of $TiO_2$, and magnesium borates and/or titanates. A dark gray or black color indicated that the recovered powder was largely or substantially completely a mixture of amorphous and crystalline titanium diboride.

The powders recovered after acid wash were so fine that it was necessary to recover them by ultra centrifuge and then filtering the suspension. The suspension was found to flocculate at a pH of 2.5–4.0 tending to cause the titanium diboride particles to settle out of the suspension. It was found that initially the acid should be kept within about 5–10% $HNO_3$ concentrations to attain best recovery of the titanim diboride.

An X-ray diffraction chart as in the drawing, FIG. 1, revealed that the reaction products are magnesium oxide and titanium diboride, apparently poorly crystallized. Electron microprobe analysis of the leached product revealed that it contained 98.6% pure titanium diboride, and EDXRA of individual particles showed no magnesium remaining. Preliminary transmission electron microscopy revealed irregular morphology particles 1 micron size or less. Selected area diffraction (SAD) of single particles showed no defined crystallinity of the majority of particles analyzed. Since X-ray diffraction (and SAD) are dependent on relative crystallinity, the powdered product of this invention clearly appears to be amorphous.

The degree to which the highly reactive powder of this invention is amorphous has been found to be dependent in part upon the rapidity with which the reaction products are cooled. Thus, where a large mass of the reaction mixture is ignited and the reaction has gone to completion, it is important to prevent localized sintering by suspending the particles and to quench the reaction product immediately, or otherwise to increase the rate of cooling to ambient temperature. If the powder is allowed to remain in the reaction vessel, crystallinity and grain growth occur. The suspension and rapid quenching of the reaction product produces a sub-micron, substantially amorphous powder.

EXAMPLE 4

In an attempt to suspend the particles during the reaction thus achieving rapid quenching and preventing local sintering and grain growth, a column was designed so the raw materials could be gravity fed through a funnel, glass tube and into a hot zone created by resistance heated hot wires. The raw materials ignited producing a sub-micron product which escaped as a smoke out of the opening in the top of the column as well as a recovered $TiB_2/MgO$ product at the base of the column which was comparable to the product in Example 2.

Metal and refractory wool insulation was used around the hot zone and MgO was used as insulation at the base of the column. The column technique was noted to be a possible continuous processing technique. The recovered product can be leached as in Example 3 above.

I claim:

1. The method of making sub-micron titanium diboride which comprises the steps of forming a powdered reaction mixture consisting essentially of titanium oxide, boron oxide and magnesium, exothermically reacting the reaction mix in an atmosphere including air to yield a reacted mass containing titanium diboride and magnesia, and leaching the reacted mass with a leaching solution having a pH in the range of about 0.5 to about 8, to recover the sub-micron titanium diboride.

2. The method of claim 1, wherein the exothermic reaction is initiated by local ignition.

3. The method of claim 1, wherein the magnesium and $B_2O_3$ are present in weight amounts within the range of about 5–30% in excess of their stoichiometric amounts.

4. The method of making titanium dioboride of sub-micron size in situ which comprises the steps of reducing titanium oxide and boron oxide with magnesium in an atmosphere including air to yield a reacted mass containing sub-micron titanium diboride and magnesia, leaching the reacted mass with a leaching solution having a pH in the range of about 0.5 to about 8, and recovering sub-micron titanium diboride.

5. The method of claim 4, wherein the reduction of titanium oxide and boron oxide with magnesium is initiated by local ignition.

6. The method of claim 4, wherein the magnesium and $B_2O_3$ are present in weight amounts within the range of about 5–30% in excess of their stoichiometric amounts.

7. The method of claim 4, wherein the step of reducing titanium oxide and boron oxide with magnesium includes feeding the reactants through a funnel into a hot zone within the funnel and igniting the reactants within the hot zone.

8. The method of claim 7, wherein the reactants are ignited by local ignition.

9. The method of making amorphous titanium diboride of sub-micron particle size, which comprises the steps of:

forming a powdered reaction mixture consisting essentially of titanium oxide, boron oxide and magnesium in which the magnesium and $B_2O_3$ are present in weight amount within the range of about 5–30% in excess of their stoichiometric amounts;

locally igniting said reaction mixture in an atmosphere including air to react the reaction mixture exothermically;

cooling the resultant product from the exothermic reaction;

leaching the reacted mass with a leaching solution having a pH in the range of about 0.5 to about 8, until the reacted, leached mass contains substantially only titanium diboride int he leaching solution; and then recovering amorphous, sub-micron titanium diboride powder from the leaching solution.

10. The method of claim 9, wherein the magnesium and boron oxide are present in weight amounts of about 10% in excess of their stoichiometric amounts.

11. The method of making titanium diboride which comprises the steps forming a powdered reaction mixture consisting essentially of titanium oxide, boron oxide and magnesium, exothermically reacting the reaction mixture in an atmosphere including air to yield a reacted product containing titanium diboride and magnesia, rapidly cooling the reacted product and then leaching the reacted product with a leaching solution having a pH in the range of about 0.5 to about 8, to recover sub-micron titanium diboride.

12. The method of claim 11, wherein the step of exothermically reacting the powdered reaction mixture includes feeding the reaction mixture through a funnel into a hot zone within the funnel and igniting the reactants within the hot zone.

13. The method of claim 12, wherein the reactants are ignited by local ignition.

* * * * *